United States Patent
Liu et al.

(10) Patent No.: US 10,681,759 B2
(45) Date of Patent: Jun. 9, 2020

(54) PAGING SCHEMES FOR PEER-TO-PEER COMMUNICATIONS

(71) Applicant: Apple Inc., Cupertino, CA (US)

(72) Inventors: Yong Liu, Campbell, CA (US);
Christiaan A. Hartman, San Jose, CA (US); Guoqing Li, Cupertino, CA (US);
Lawrie Kurian, San Jose, CA (US);
Peter N. Heerboth, San Jose, CA (US);
Su Khiong Yong, Palo Alto, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/110,557

(22) Filed: Aug. 23, 2018

(65) Prior Publication Data

US 2019/0075609 A1    Mar. 7, 2019

Related U.S. Application Data

(60) Provisional application No. 62/553,191, filed on Sep. 1, 2017.

(51) Int. Cl.
*H04W 4/00* (2018.01)
*H04W 76/14* (2018.01)
*H04W 8/00* (2009.01)
*H04W 84/12* (2009.01)
*H04W 48/12* (2009.01)

(52) U.S. Cl.
CPC .......... *H04W 76/14* (2018.02); *H04W 8/005* (2013.01); *H04W 48/12* (2013.01); *H04W 84/12* (2013.01)

(58) Field of Classification Search
CPC ..... H04W 84/12; H04W 48/16; H04W 88/08; H04W 48/18; H04W 48/20
See application file for complete search history.

(56) References Cited

U.S. PATENT DOCUMENTS

| | | | |
|---|---|---|---|
| 9,295,096 B1* | 3/2016 | Shukla | H04W 84/12 |
| 9,307,483 B2 | 4/2016 | Sampath | |
| 2012/0008556 A1* | 1/2012 | Noh | H04W 72/04 370/328 |
| 2012/0202543 A1* | 8/2012 | Murias | H04W 4/70 455/509 |
| 2014/0071873 A1* | 3/2014 | Wang | H04W 74/08 370/311 |
| 2014/0092801 A1* | 4/2014 | Kim | H04L 12/1877 370/312 |

(Continued)

FOREIGN PATENT DOCUMENTS

CN    102547985 A    5/2015

*Primary Examiner* — Atique Ahmed
(74) *Attorney, Agent, or Firm* — Kowert, Hood, Munyon, Rankin & Goetzel, P.C.

(57) ABSTRACT

One or more wireless stations may operate to configure direct communication with neighboring mobile stations, e.g., direct communication between the wireless stations without utilizing an intermediate access point. A mechanism for a wireless station to transmit a paging beacon outside of a paging window may include establishing a paged data link with a peer station, determining that one or more data frames associated with the paged data link are pending transmission, and transmitting a beacon to the peer station outside of a scheduled paging window of the paged data link. The beacon may include a paging attribute indicating there are pending data frames.

20 Claims, 18 Drawing Sheets

(56) References Cited

U.S. PATENT DOCUMENTS

| | | | |
|---|---|---|---|
| 2015/0063192 A1 | 3/2015 | Zukas | |
| 2015/0109981 A1* | 4/2015 | Patil | H04W 52/0216 |
| | | | 370/311 |
| 2015/0163689 A1* | 6/2015 | Lee | H04W 76/14 |
| | | | 370/328 |
| 2016/0345295 A1* | 11/2016 | Yang | H04L 67/104 |
| 2018/0027494 A1* | 1/2018 | Huang | H04W 76/10 |
| | | | 370/311 |
| 2018/0206260 A1* | 7/2018 | Khoryaev | H04W 72/1242 |
| 2019/0069242 A1* | 2/2019 | Park | H04W 52/02 |

* cited by examiner

| Field | Size (Octets) | Description |
|---|---|---|
| FC | 2 | Frame Control field |
| Duration | 2 | Duration value for the beacon frame |
| A1 | 6 | Broadcast Address |
| A2 | 6 | Transmitter MAC address |
| A3 | 6 | Cluster ID identifying the NAN cluster |
| Seq. Ctrl | 2 | Sequence Control field |
| Time Stamp | 8 | Time Stamp of the beacon frame |
| Beacon Interval | 2 | Time units between beacons |
| Capability | 2 | Capability information field |
| NAN IE | Variable | NAN information element |
| FCS | 4 | Frame checksum |

FIG. 4A

| Field | Size | Description |
|---|---|---|
| Category | 1 | IEEE 802.11 public action frame (PAF) or protected dual of PAF |
| Action | 1 | IEEE 802.1 PAF vendor specific |
| OUI | 3 | Wi-Fi Alliance specific OUI |
| OUI Type | 1 | Identifying type and version of NAN |
| NAN attributes | Variable | One or more NAN attributes |

FIG. 4B

| Attributes | NAN SDF Frames | | | | |
|---|---|---|---|---|---|
| | Publish | | | Subscribe | Follow-up |
| | Data | Ranging | Otherwise | | |
| Master Indication | NO | NO | NO | NO | NO |
| Cluster | NO | NO | NO | NO | NO |
| Service ID List | NO | NO | NO | NO | NO |
| Service Descriptor | YES/M | YES/M | YES/M | YES/M | YES/M |
| NAN Con. Cap. | YES/O | YES/O | YES/O | YES/O | YES/O |
| WLAN Infra | YES/O | YES/O | YES/O | YES/O | YES/O |
| P2P Operation | YES/O | YES/O | YES/O | YES/O | YES/O |
| IBSS | YES/O | YES/O | YES/O | YES/O | YES/O |
| Mesh | YES/O | YES/O | YES/O | YES/O | YES/O |
| Further Service Dis | YES/O | YES/O | YES/O | YES/O | YES/O |
| Further Avail Map | YES/O | YES/O | YES/O | YES/O | YES/O |
| Country Code | YES/O | YES/O | YES/O | YES/O | YES/O |
| Ranging | YES/O | YES/O | YES/O | YES/O | YES/O |
| Cluster Discovery | NO | NO | NO | NO | NO |
| Service Desc. Ext | YES/M | YES/M | YES/O | YES/O | YES/O |
| Device Cap. | YES/M | YES/M | YES/O | YES/O | YES/O |
| NDP | NO | NO | NO | NO | NO |
| NAN Availability | YES/M | YES/M | YES/O | YES/O | YES/O |
| NDC | YES/O | YES/O | YES/O | YES/O | YES/O |
| NDL | NO | NO | NO | NO | NO |
| NDL QoS | NO | NO | NO | NO | NO |
| Unaligned Sched. | YES/O | YES/O | YES/O | YES/O | YES/O |
| Ranging Info. | NO | YES/M | NO | NO | YES/O |
| Ranging Setup | NO | NO | NO | NO | NO |
| FTM Rang. Rep. | NO | NO | NO | NO | NO |
| Element Container | YES/O | YES/O | YES/O | YES/O | YES/O |
| Ex. WLAN Infra. | YES/O | YES/O | YES/O | YES/O | YES/O |
| Ex. P2P Operation | YES/O | YES/O | YES/O | YES/O | YES/O |
| Ex. IBSS | YES/O | YES/O | YES/O | YES/O | YES/O |
| Ex. Mesh | YES/O | YES/O | YES/O | YES/O | YES/O |
| Cipher Suit Info. | YES/O | YES/O | YES/O | YES/O | YES/O |
| Security Con. Info. | YES/O | YES/O | YES/O | YES/O | YES/O |
| Shared-Key Desc. | NO | NO | NO | NO | NO |
| Public Availability | YES/O | YES/O | YES/O | YES/O | YES/O |
| Vendor Specific | YES/O | YES/O | YES/O | YES/O | YES/O |

*FIG. 4C*

| Field | Size | Description |
|---|---|---|
| Category | 1 | IEEE 802.11 public action frame (PAF) or protected dual of PAF |
| Action | 1 | IEEE 802.1 PAF vendor specific |
| OUI | 3 | Wi-Fi Alliance specific OUI |
| OUI Type | 1 | Identifying type and version of NAN |
| OUI Subtype | 1 | Identifying type of NAN action frame |
| Information Content | variable | Fields and/or attributes for specific NAN action frames |

*FIG. 4D*

PAGING SCHEMES FOR PEER-TO-PEER COMMUNICATIONS

PRIORITY DATA

This application claims benefit of priority to U.S. Provisional Application Ser. No. 62/553,191, titled "Paging Schemes for Peer-to-Peer Communications", filed Sep. 1, 2017, by Yong Liu, Christiaan A. Hartman, Guoqing Li, Lawrie Kurian, Peter N. Heerboth, and Su Khiong Yong, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to communicate directly with each other without using an intermediate access point. However, improvements in the operation of such devices are desired, such as in the setup and coordination of the communication between such devices.

SUMMARY

Some embodiments described herein relate to systems and methods for peer wireless stations (e.g., wireless stations configured to communicate with neighboring wireless stations without utilizing an intermediate access point) to transmit a paging beacon outside of a paging window.

Some embodiments relate to a wireless station that includes one or more antennas, one or more radios, and one or more processors coupled (directly or indirectly) to the radios. At least one radio is configured to perform Wi-Fi communications, e.g., via a Wi-Fi interface. The wireless station may perform voice and/or data communications, as well as any or all of the methods described herein.

In some embodiments, one or more wireless stations operate to configure direct communication with one or more neighboring mobile stations, e.g., direct communication between the wireless stations without utilizing an intermediate access point. Embodiments of the disclosure relate to a mechanism for peer devices to transmit a paging beacon outside of a paging window of a paged peer-to-peer communication session.

In some embodiments, the communications may be performed via a peer-to-peer wireless communications protocol, such as Neighbor Awareness Networking (NAN). Thus, embodiments of the disclosure also relate to a NAN device transmitting a paging beacon outside a paging window of a paged peer-to-peer communication session.

In some embodiments, a wireless station may be configured to establish, with a peer wireless station, a peer-to-peer data communication session (e.g., a paged data link), where the wireless station and the peer wireless station are associated with a data cluster. The wireless station may be configured to determine that the wireless station has one or more pending data frames to transmit for the paged data link and transmit, outside of a scheduled paging window associated with the paged data link, a beacon to the peer wireless station. In some embodiments, the beacon may include a paging attribute indicating the pending data frames. In some embodiments, devices within the data cluster may have scheduled periodic common resource blocks (CRBs) and the beacon may be transmitted in one or more of the common CRBs. In some embodiments, the beacon may be transmitted in a discovery window. In some embodiments, the beacon may be a discovery beacon or a synchronization beacon.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIG. 4A illustrates an example format of a synchronization/discovery beacon frame, according to some embodiments.

FIG. 4B illustrates an example format of a service discovery frame (SDF), according to some embodiments.

FIG. 4C illustrates an example format of a NAN attribute field, according to some embodiments, FIG. 4D illustrates an example format of an action frame, according to some embodiments.

Figure 1:
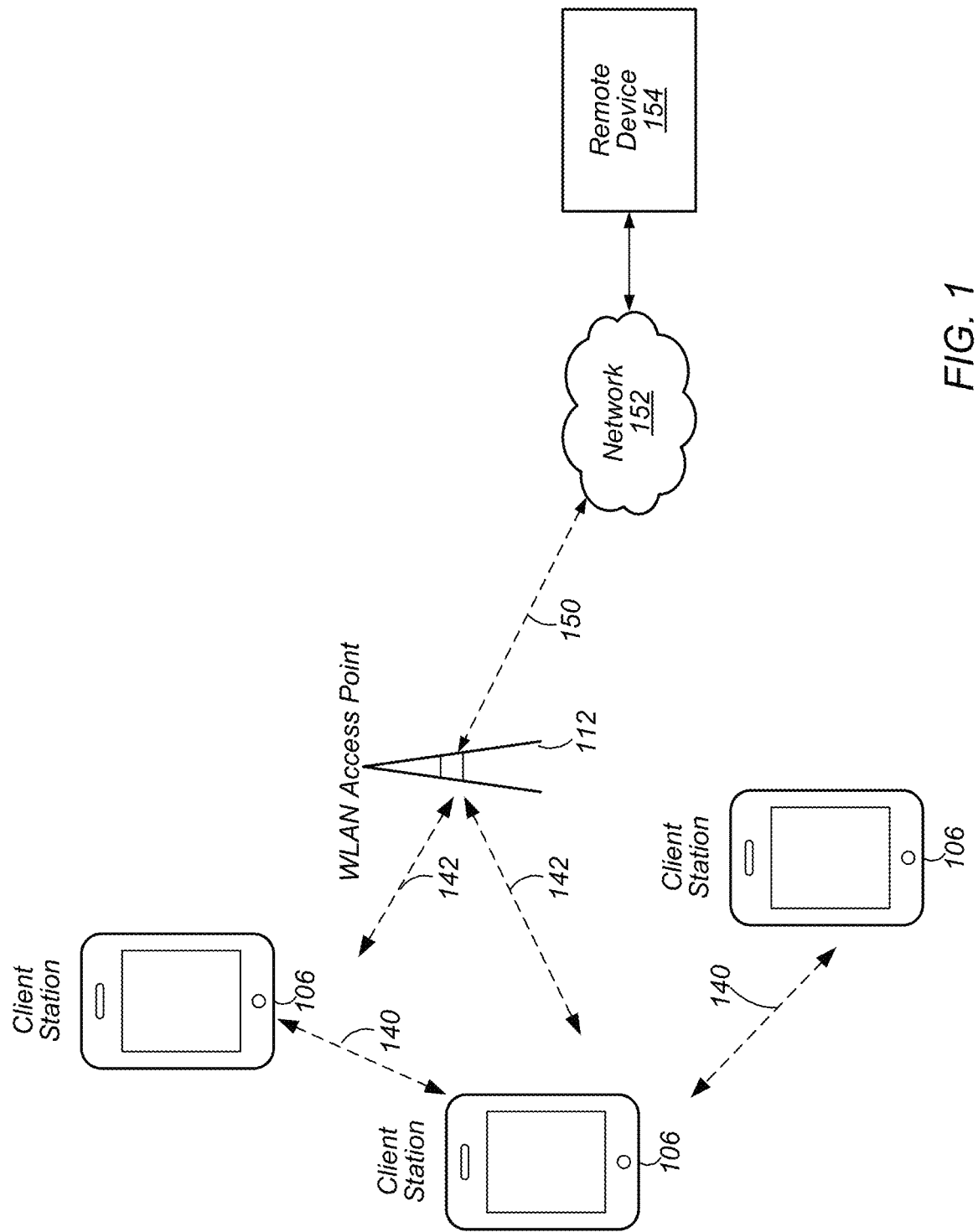
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:
UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™) portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices)

which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

WI-FI—The term "WI-FI" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "WI-FI". A WI-FI (WLAN) network is different from a cellular network.

BLUETOOTH™—The term "BLUETOOTH™" has the full breadth of its ordinary meaning, and at least includes any of the various implementations of the Bluetooth standard, including Bluetooth Low Energy (BTLE) and Bluetooth Low Energy for Audio (BTLEA), including future implementations of the Bluetooth standard, among others.

Personal Area Network—The term "Personal Area Network" has the full breadth of its ordinary meaning, and at least includes any of various types of computer networks used for data transmission among devices such as computers, phones, tablets and input/output devices. Bluetooth is one example of a personal area network. A PAN is an example of a short range wireless communication technology.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

"A and/or B"—refers to a combination of elements, e.g., A alone, B alone, or A and B together. May also have the same meaning as "at least one of A and B."

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods to transmit, while operating in a first state, synchronization beacons to a peer wireless device within one or more discovery windows. The peer wireless device and the wireless device 106 may have an active peer-to-peer data session and may be associated with a first cluster of devices. The wireless device 106 may be configured to notify the peer wireless device of a merge to a second cluster of devices and transition to a second state where transmissions of synchronization beacons to the peer wireless device are discontinued. In addition, the wireless device 106 may be configured to transmit, while operating in the second state and for at least a first time period, discovery beacons to the peer wireless device in one or more data cluster management windows.

In some embodiments, as further described below, a wireless device 106 may be configured to perform methods to establish, with a peer wireless device, a peer-to-peer data communication session (e.g., a paged data link), where the wireless device 106 and the peer wireless device are associated with a data cluster. The wireless device 106 may be configured to determine that the wireless device 106 has one or more pending data frames to transmit for the paged data link and transmit, outside of a scheduled paging window associated with the paged data link, a beacon to the peer wireless station. In some embodiments, the beacon may include a paging attribute indicating the pending data frames. In some embodiments, devices within the data cluster may have scheduled periodic common resource blocks (CRBs) and the beacon may be transmitted in the common CRBs. In some embodiments, the beacon may be transmitted in a discovery window. In some embodiments, the beacon may be a discovery beacon or a synchronization beacon.

Figure 2:
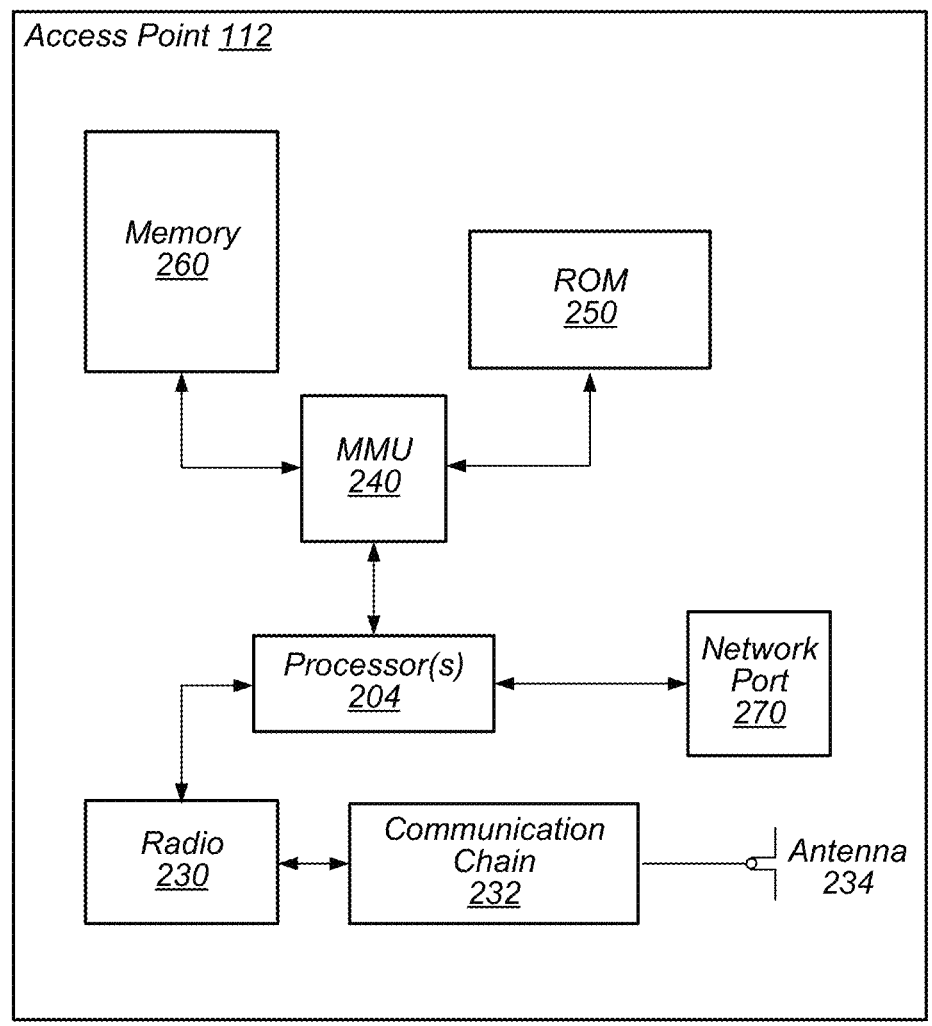
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods to establish, with a peer wireless device, a peer-to-peer data communication session (e.g., a paged data link), where the AP 112 and the peer wireless device are associated with a data cluster. The AP 112 may be configured to determine that the AP 112 has one or more pending data frames to transmit for the paged data link and transmit, outside of a scheduled paging window associated with the paged data link, a beacon to the peer wireless station. In some embodiments, the beacon may include a paging attribute indicating the pending data frames. In some embodiments, devices within the data cluster may have scheduled periodic common resource blocks (CRBs) and the beacon may be transmitted in the common CRBs. In some embodiments, the beacon may be transmitted in a discovery window. In some embodiments, the beacon may be a discovery beacon or a synchronization beacon.

In some embodiments, as further described below, an AP 112 may be configured to perform methods to receive synchronization beacons from a peer wireless device within one or more discovery windows. The peer wireless device may be operating in a first state. In addition, the peer wireless device and the AP 112 may have an active peer-to-peer data session and may be associated with a first cluster of devices. The AP 112 may be configured to receive a notification from the peer wireless device of a merge to a second cluster of devices. The peer wireless device may be configured to transition from the first state to a second state in response to the merge. In addition, in response to the transition to the second state, the peer wireless device may be configured to discontinue transmissions of synchronization beacons. The AP 112 may be configured to transmit a request for synchronization assistance to the peer wireless device and receive, in response to the request, one or more discovery beacons from the peer wireless device in one or more data cluster management windows.

Figure 3:
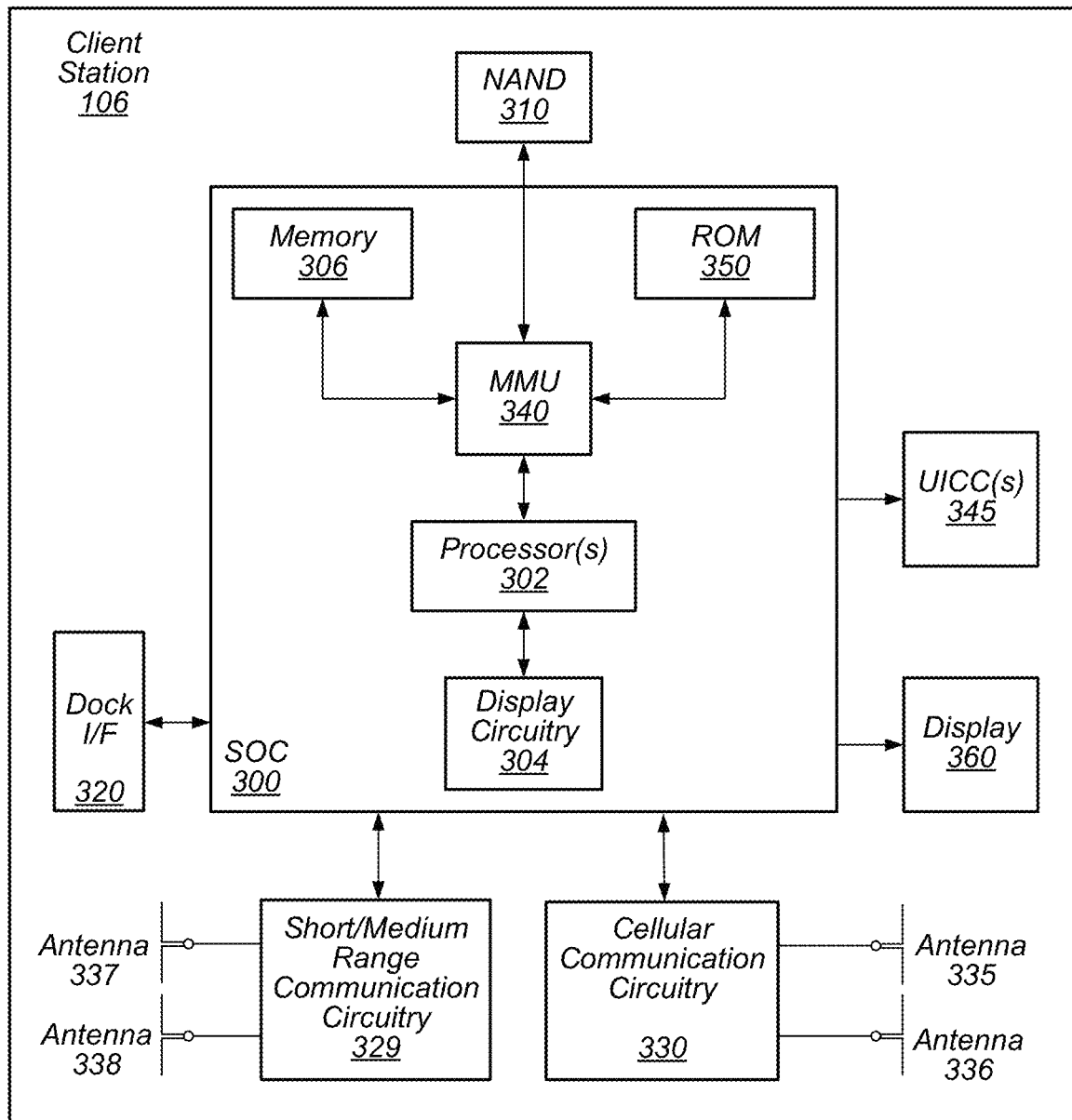
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods to establish, with a peer wireless device, a peer-to-peer data communication session (e.g., a paged data link), where the client station 106 and the peer wireless device are associated with a data cluster. The client station 106 may be configured to determine that the client station 106 has one or more pending data frames to transmit for the paged data link and transmit, outside of a scheduled paging window associated with the paged data link, a beacon to the peer wireless station. In some embodiments, the beacon may include a paging attribute indicating the pending data frames. In some embodiments, devices within the data cluster may have scheduled periodic common resource blocks (CRBs) and the beacon may be transmitted in the common CRBs. In some embodiments, the beacon may be transmitted in a discovery window. In some embodiments, the beacon may be a discovery beacon or a synchronization beacon As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Peer-to-Peer Frame Formats

In some embodiments, Wi-Fi devices (e.g., client station 106) may be able to communicate with each other in a peer to peer manner, e.g., without the communications going through an intervening access point. In some embodiments, devices may exchange one or more management frames, e.g., such as synchronization/discovery beacon frames, service discovery frames (SDFs), and/or action frames, in order to synchronize, advertise, solicit, and/or negotiate a peer-to-peer data session, such as a NAN datapath and/or a NAN datalink. In some embodiments, particular management frame formats (e.g., synchronization/discovery beacon frame formats, SDF formats, and/or action frame formats) may be implemented to transport information associated with embodiments disclosed herein.

For example, as illustrated by FIG. 4A, a synchronization/discovery beacon frame format (e.g., as specified by NAN 2.0) may include fields such as a frame control (FC) filed, a duration field, multiple address fields (e.g., A1-A3), a sequence control field, a time stamp field, a beacon interval field, a capability information field, a NAN information element (IE) field, and/or a frame checksum (FCS) field. The frame control field, duration field, sequence control field, time stamp field, beacon interval field, capability field, and FCS field may be defined by IEEE 802.11. Note that for synchronization beacons, the beacon interval field may be set to 512 TUs, which may correspond to a time interval between consecutive starts of discovery windows. In addition, for discovery beacons, the beacon interval field may be set to 100 TUs, which may correspond to an average time between consecutive discovery beacon transmissions by a device in a master role. Addresses may include a broadcast address (A1), a transmitter medium access control (MAC) address (A2), and a cluster identifier address (A3). In some embodiments, the NAN IE may be vendor specific and may be configured to transport information associated with embodiments disclosed herein.

As another example, as illustrated by FIG. 4B, a service discovery frame format (e.g., as specified by NAN 2.0) may include one or more fields, including a category field, an action field, an organizationally unique identifier (OUI) field, an OUI type field, and/or a NAN attributes field. In some embodiments, information associated with embodiments disclosed herein may be transported via the NAN attributes field. In some embodiments, information associated with embodiments disclosed herein may be transported via the OUI field and/or the OUI type field.

Further, as illustrated by FIG. 4C, the NAN attribute field (e.g., as specified by NAN 2.0) includes multiple fields that may be used to implement features of embodiments disclosed herein. For example, in some embodiments, information associated with embodiments disclosed herein may be transported via any of (or any combination of) attributes included in the NAN attribute field. For example, in some embodiments, the vendor specific attribute may be used to transport information associated with embodiments disclosed herein. As another example, the further availability map attribute may be used to transport information associated with embodiments disclosed herein. As shown, the NAN attribute field may contain (or included) different attributes based on a type of NAN SDF frame. For example, a publish SDF frame for data transmission may include both mandatory (M) and optional (O) attributes that differ from a publish SDF frame for ranging and/or other purposes (e.g., "Otherwise"). Similarly, a subscribe SDF frame may include differing attributes as compared to a follow-up SDF and/or the various publish SDF frames. Thus, as a further example, various configurations of a NAN attribute may be used to transport information associated with embodiments disclosed herein.

As yet a further example, as illustrated by FIG. 4D, an action frame format (e.g., as specified by NAN 2.0) may include one or more fields, including a category field, an action field, an OUI field, an OUI type field, an OUI subtype field and/or an information content field. In some embodiments, information associated with embodiments disclosed herein may be transported via the information content field. In some embodiments, information associated with embodiments disclosed herein may be transported via the OUI field, the OUI type field, and/or the OUI subtype field.

Wi-Fi Peer to Peer Communication Protocols

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). The NAN protocol also may incorporate additional aspects. NAN 1.0 describes methods for NAN protocol synchronization and discovery. After two wireless stations have discovered each other (per NAN 1.0) they may implement a procedure to setup a NAN datapath between them so that they can communicate. After this, the two wireless stations arrange for a common datapath negotiation window so that they can negotiate capabilities, synchronization requirements, and/or exchange further service information (e.g., per NAN 2.0). The datapath negotiation window is a time window that enables two wireless stations to communicate with each other so that they can negotiate capabilities and/or synchronization requirements, and exchange further service information. Once the datapath negotiation window has been established and NAN datapath setup has been performed, the wireless stations may perform datapath synchronization to help ensure that the two stations stay synchronized with each other for communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Figure 5:
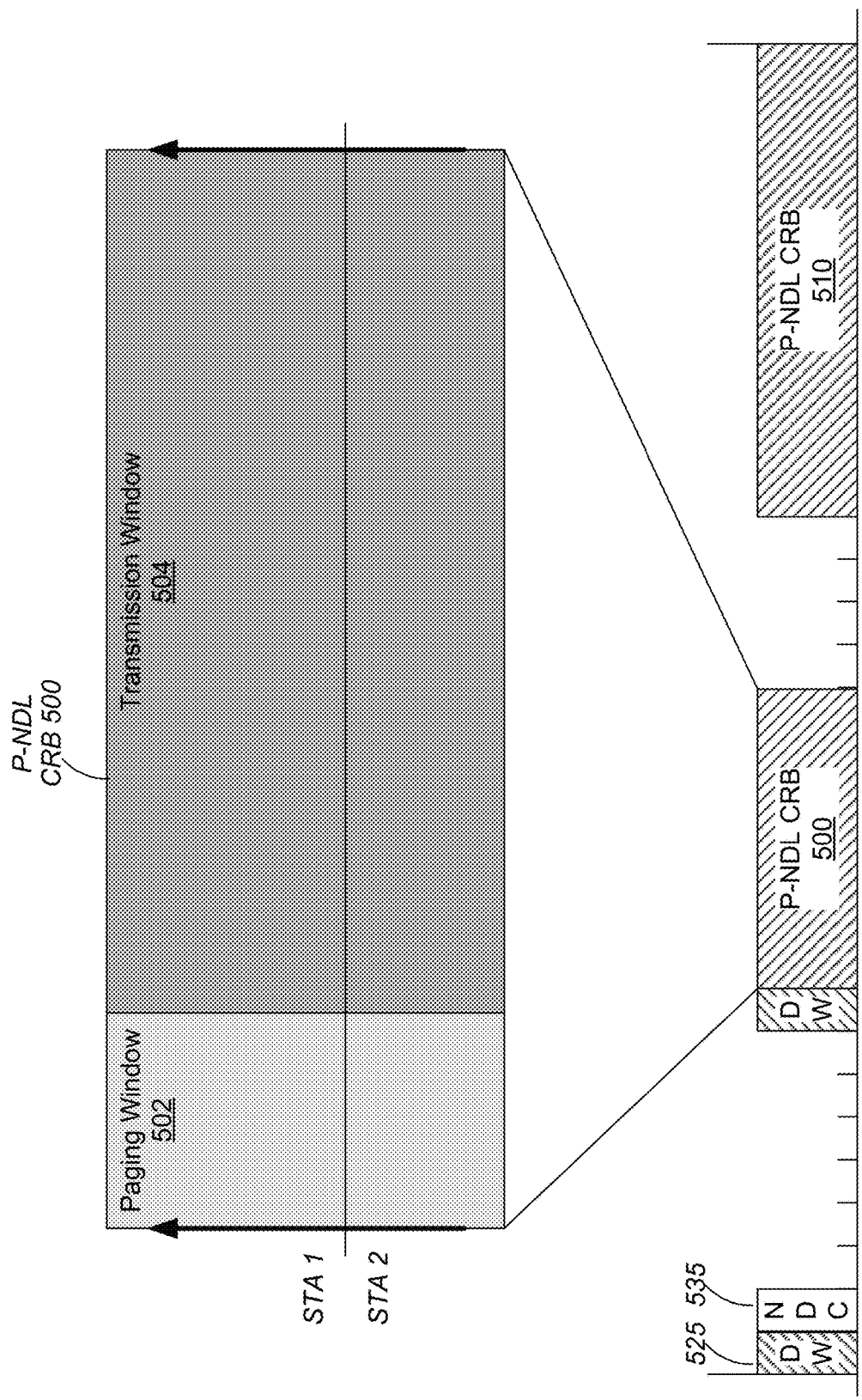
FIG. 5 illustrates an example of a communication schedule for a paged data link.
Figure 6A:
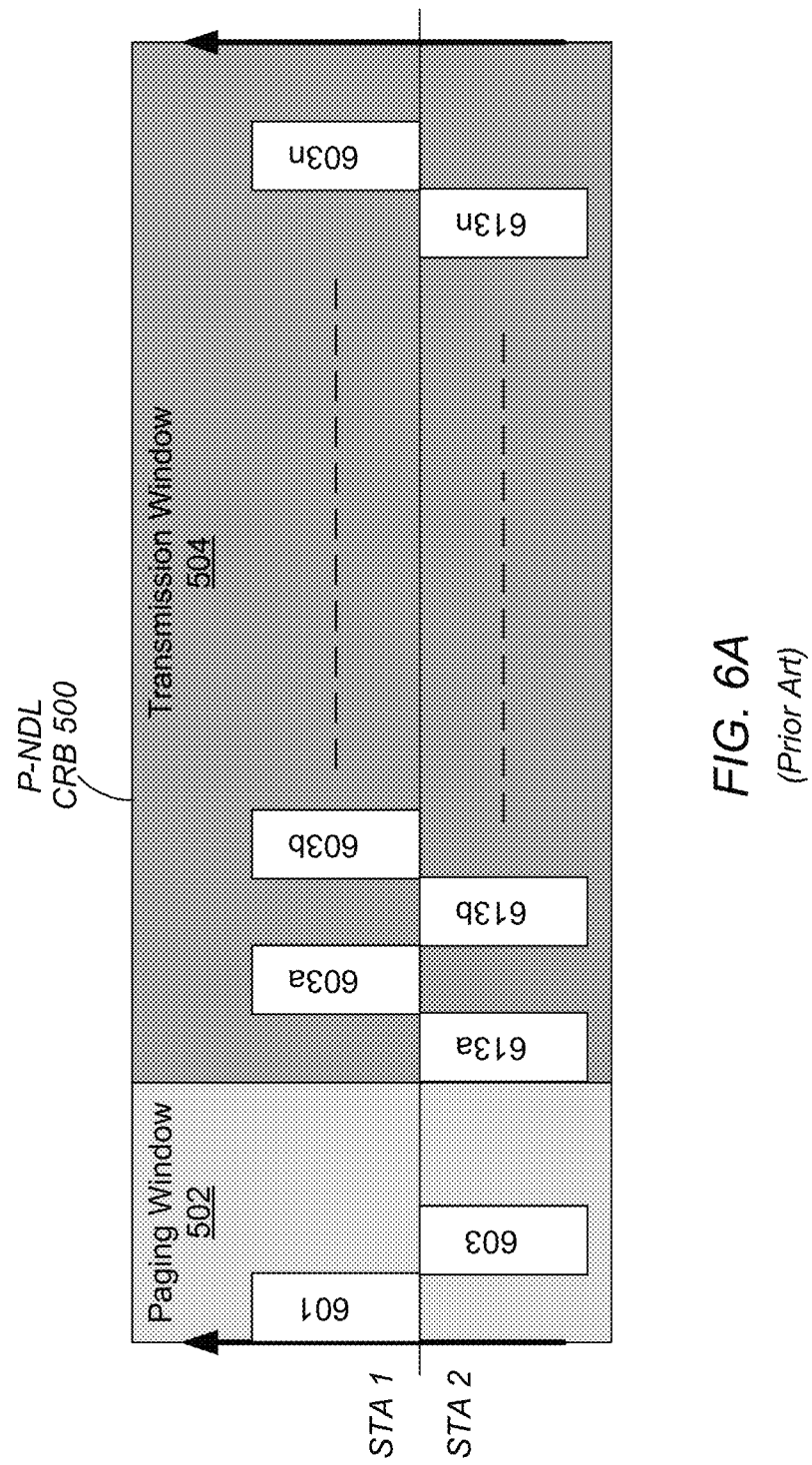
FIGS. 6A-D illustrate examples of transmissions during a CRB for a paged data link.
Figure 6B:
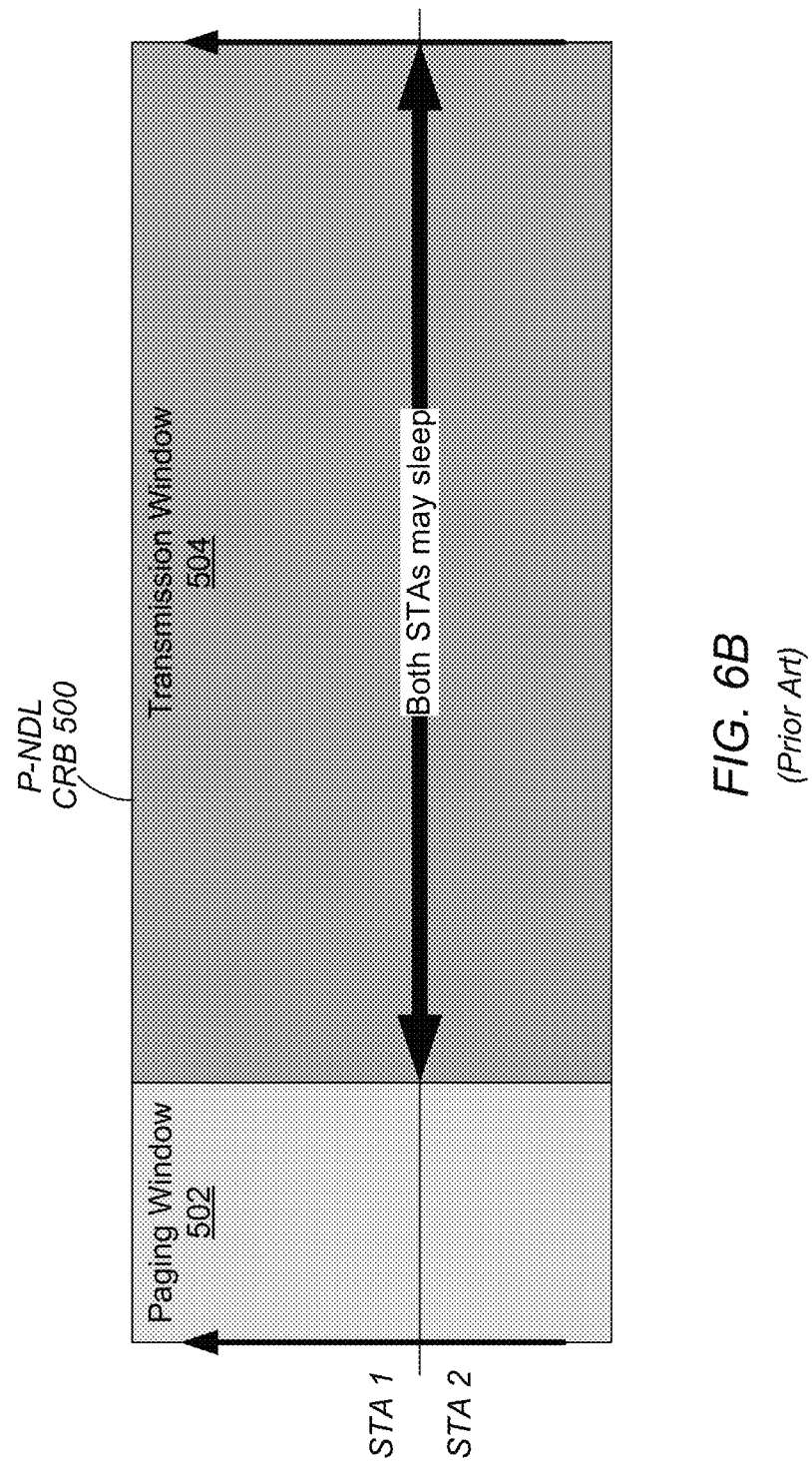

Embodiments described herein further define methods (and/or mechanisms) for a wireless station (including, but not limited to, a NAN device) to transmit paging beacon outside of a paging window Peer-to-Peer Paging Schemes In some implementations, wireless stations may establish a paged peer-to-peer communication scheme or implementation to exchange data. For example, wireless stations may establish a paged NAN data link (NDL) that may allow for more power efficient communication as opposed to, e.g., a synchronized NDL. In some implementations, when establishing a paged NDL, wireless devices may agree to communicate within a series of paged NDL common resource blocks (CRBs) as illustrated by FIG. 5. For example, in some implementations, a communication schedule for a paged NDL (P-NDL) may include a discovery window (DW) 525 followed by a NAN data cluster window (NDC) 535. In addition, the communication schedule may include an additional DW followed by one or more CRBs (e.g., such as P-NDL CRBs 500 and 510). In some implementations, a CRB of a paged NDL may include two windows. The first window may be a paging window (PW), such as paging window 502, that starts the paged NDL CRB. The second window may be a transmission window (TxW), such as transmission window 504, that follows the PW. In some implementations, the TxW may immediately follow the PW. In some implementations, the PW may be a minimum of ten percent of the CRB and, e.g., 10 time units (TUs). In some implementations, as illustrated by FIG. 6A, when a device has pending (e.g., buffered) transmissions (data) at the start of a paged NDL CRB, the device may transmit a page message (e.g., messages 601 and 603) within the PW of the paged NDL CRB. In addition, both devices involved in the paged NDL may be available during the PW of each paged NDL CRB for receiving potential page message from one another. Upon receiving a page message from a peer device during a PW, the device may transmit a trigger message (e.g., 613*a*, 613*b*, 613*n*) to the peer at the beginning of a subsequent TxW. The peer device may start to transmit the one or more pending (buffered) data frames (e.g., 603*a*, 603*b*, 603*n*) after it receives the trigger message from the device. In some implementations, as illustrated by FIG. 6B, if the device does not receive a page message from the peer device during a PW and the device does not have any pending (buffered) transmission (e.g., one or more pending data frames) for the peer device, then the device may go to sleep (e.g., enter a power savings mode in which transmit and/or receive chains may be disabled) during the subsequent TxW.

Figure 6C:
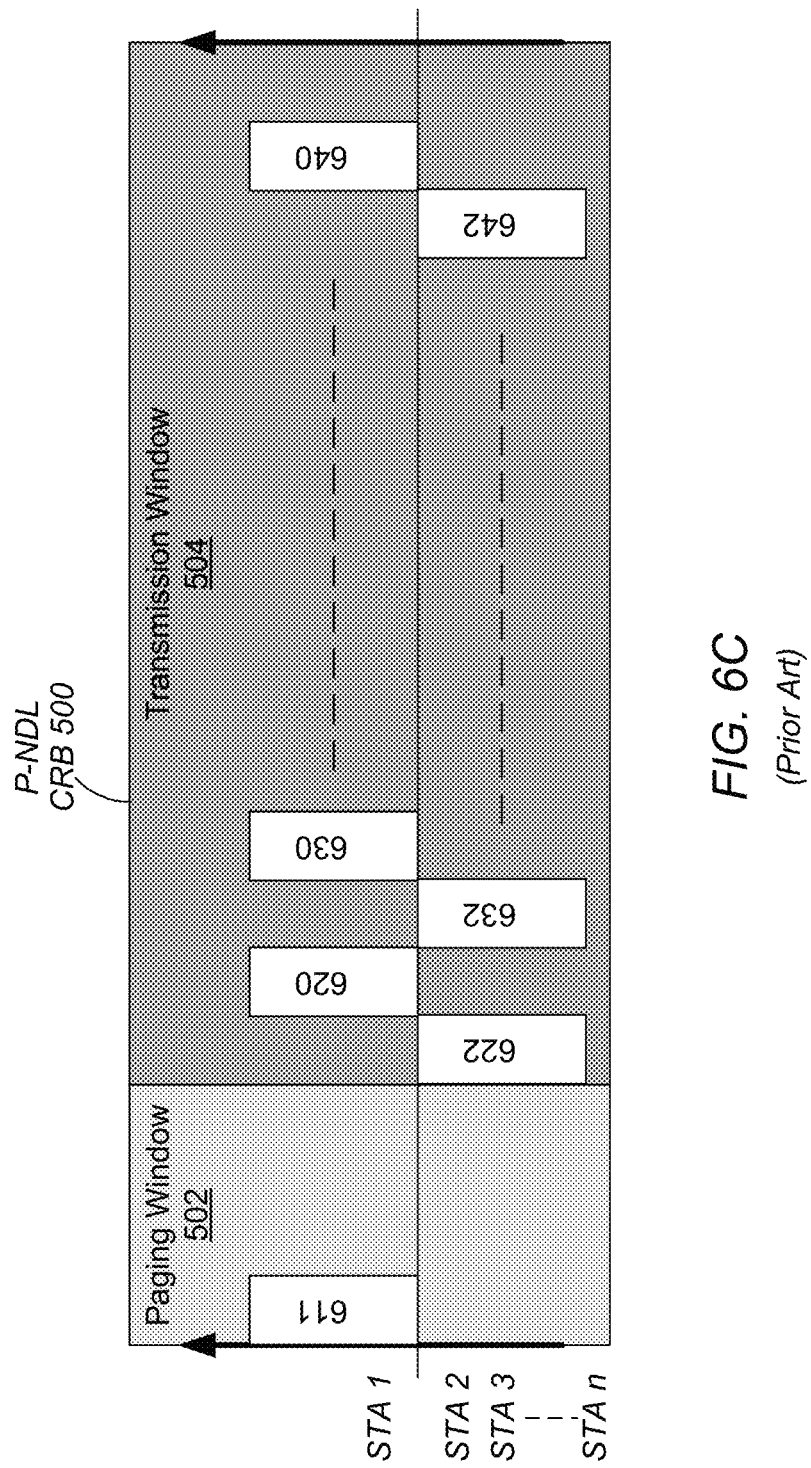

In some implementations, as illustrated by FIG. 6C, a device may use a paged NDL to manage NDLs for multiple peers. For example, a device may schedule multiple peers in common paged NDL CRBs and may then transmit a broadcast page message 611 during a shared PW and include a traffic indication map (TIM) in the broadcast page message to indicate which peers are paged (and which are not) and then transmit data (e.g., 620, 630, 640) responsive to trigger frames (e.g., 622, 632, 642) received from peer devices. In some implementations, in order to use TIMs, devices establishing paged NDLs may assign NDL peer identifiers (IDs) to one another. Note that in some implementations, if a paged NDL CRB is longer than 196 TUs, the CRB may be fragment into two or more shorter paged NDL CRBs and each fragmented CRB, except for the last one, may have a duration of 128 TU, while the last fragmented CRB may have a duration of up to 192 TUs.

Figure 6D:
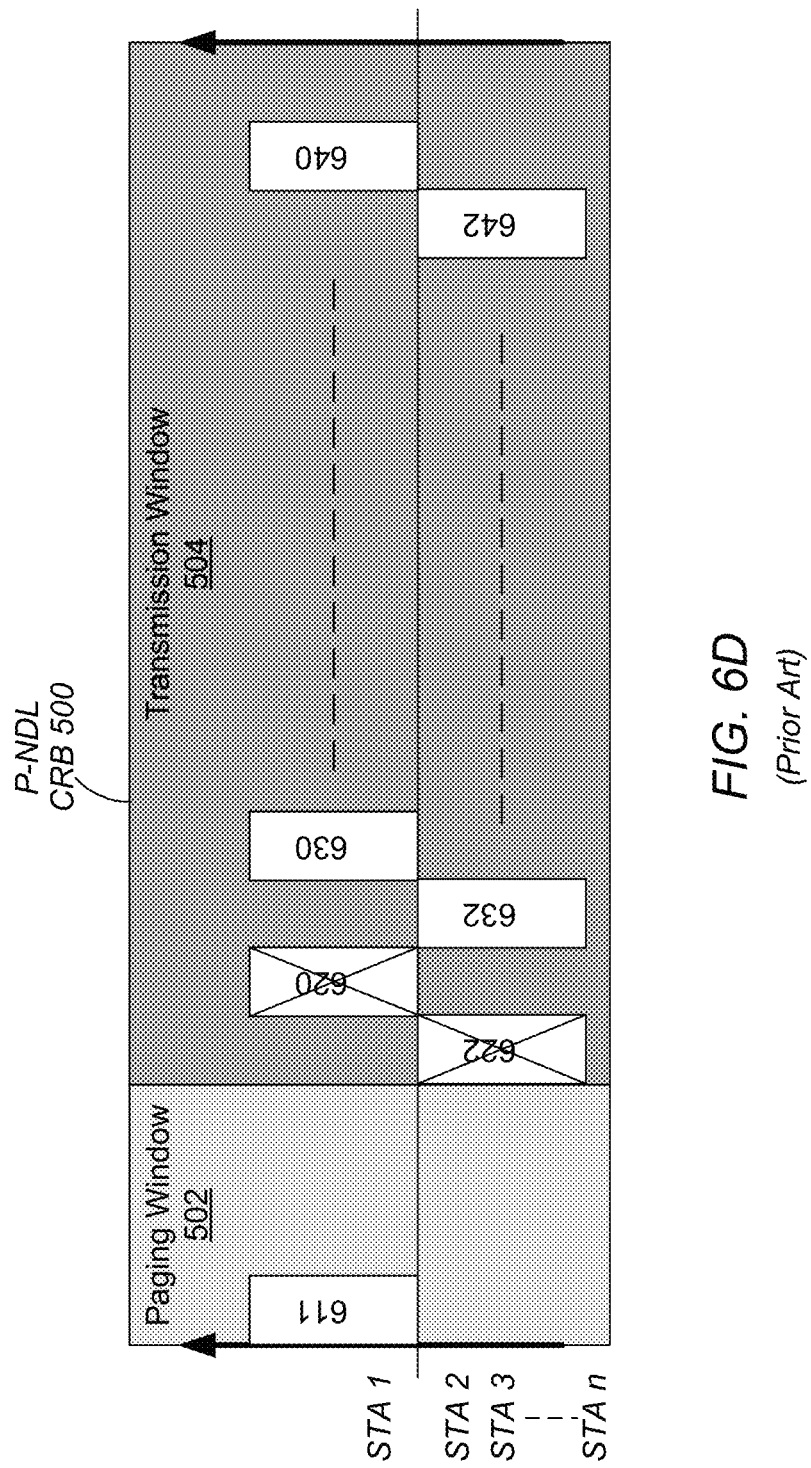

In some implementations, devices may be required to remain awake (e.g., capable of transmitting and/or receiving) during each paged NDL CRB, which, in some instances, may be unnecessary. For example, as illustrated by FIG. 6D, the page-trigger mechanism may allow a device to skip one or multiple paged NDL CRBs since a peer device will not transmit pending (buffered) data frames until after the peer device receives a trigger from the device (e.g., cancelling trigger frame 622 results in data frame 620 not being transmitted). In addition, devices with different power constraints may not be treated differently. For example, although devices with sufficient power could be present at every PW and devices with limited power could skip some PWs, e.g., based on its traffic conditions, all devices may be required to be present at every PW.

Figure 6E:
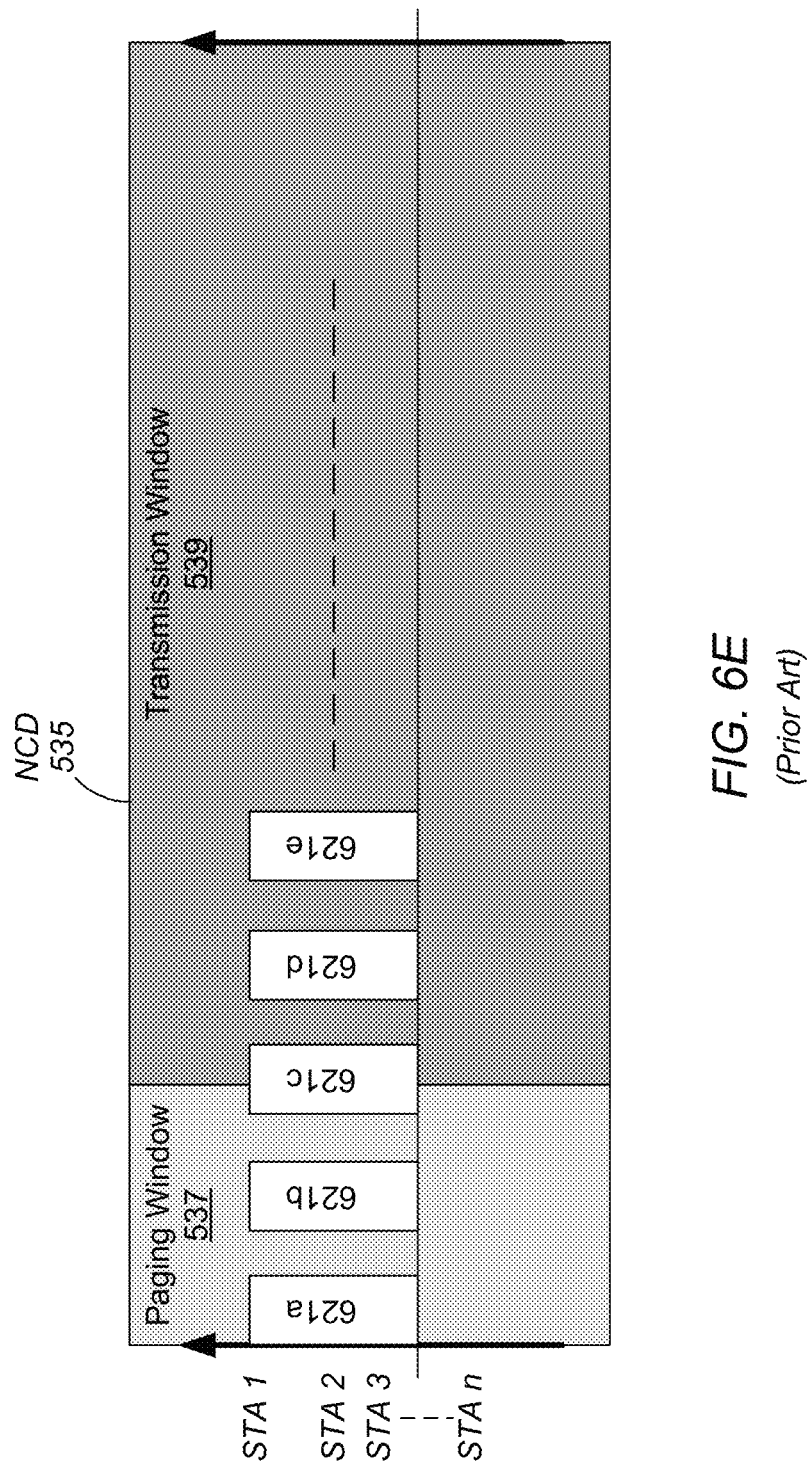
FIG. 6E illustrates an example of transmissions during a paging window of a data cluster window of a paged data link.

Further, in some implementations, a PW corresponding to a NAN data cluster (NDC) CRB (if treated as a paged NDL CRB) may be too short for all peer devices to transmit paging messages, e.g., as illustrated by FIG. 6E. Note that an NDC CRB is a common period when all NAN devices in the NDC are present (e.g., available on a common channel to transmit and/or receive beacons) and the NDC CRB may be a subset of paged NDL CRBs for all paged NDL pairs in the NDC. Thus, all paged NDL pairs with pending (buffered) data frames may need to transmit page messages (e.g., 621*a*-621*e*) at the start of the NDC CRB, however, the default NDC CRB size is one NAN slot (e.g., 16 TU) so the corresponding PW is 1.6 TU, which may not accommodate all of the page messages for the NDC. Hence, some devices may start to transmit trigger frames after the 1.6 TU PW (e.g., after paging window 537 and/or during transmission window 539), which may contend for medium access with page messages not transmitted in the PW. In addition, some devices may go to sleep after the 1.6 TU PW in response to not receiving pending data information during the PW, e.g., if the page message is sent after the 1.6 TU PW.

Figure 7A:
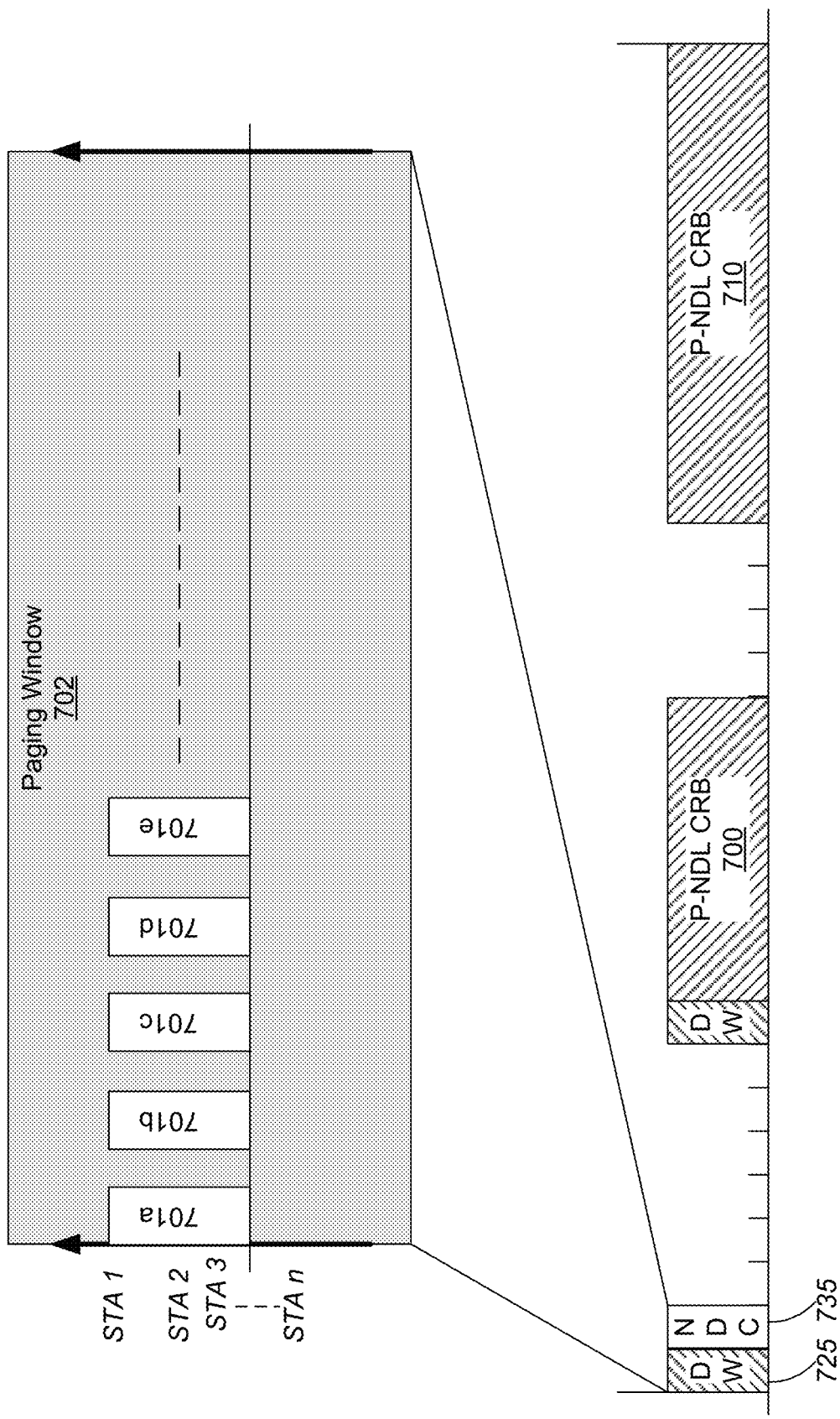
FIG. 7A illustrates an example of a device transmitting paging beacons during discovery windows, according to some embodiments.

Thus, in some embodiments, devices (e.g., such as client station 106) that establish paged data links (or paged NDLs) may use beacons (e.g., discovery and/or synchronization beacons) to carry a paging attribute. Such beacons may serve as broadcast paging messages (e.g., paging beacons). For example, as illustrated by FIG. 7A, device (e.g., STA 1 to STA n) in a master role or a non-master role sync state may transmit paging beacons (e.g., beacons 701*a*-701*e*) during discovery windows (e.g., DW 725 and NDC CRB 735). In addition, a device without pending data frames for any paged data link peer may transmit beacons as needed or desired, e.g., without including a paging attribute and/or including a paging attribute with a peer data link identifier (ID) bitmap set to all zero. As another example, a device in a non-master non-sync state may transmit paging beacons from the start of an NDC CRB 735, if the device has pending data frames for any peer. Thus, an NDC CRB may be treated as an additional paged data link CRB (e.g., in addition to paged NDL CRBs 700 and/or 710) that only includes a paging window (PW). In some embodiments, a device may transmit paging beacons with a higher medium access priority than other frames. In some embodiments, a device may be awake during the NDC CRB (e.g., during the entire duration of the NDC CRB) to avoid missing paging beacons.

Figure 7B:
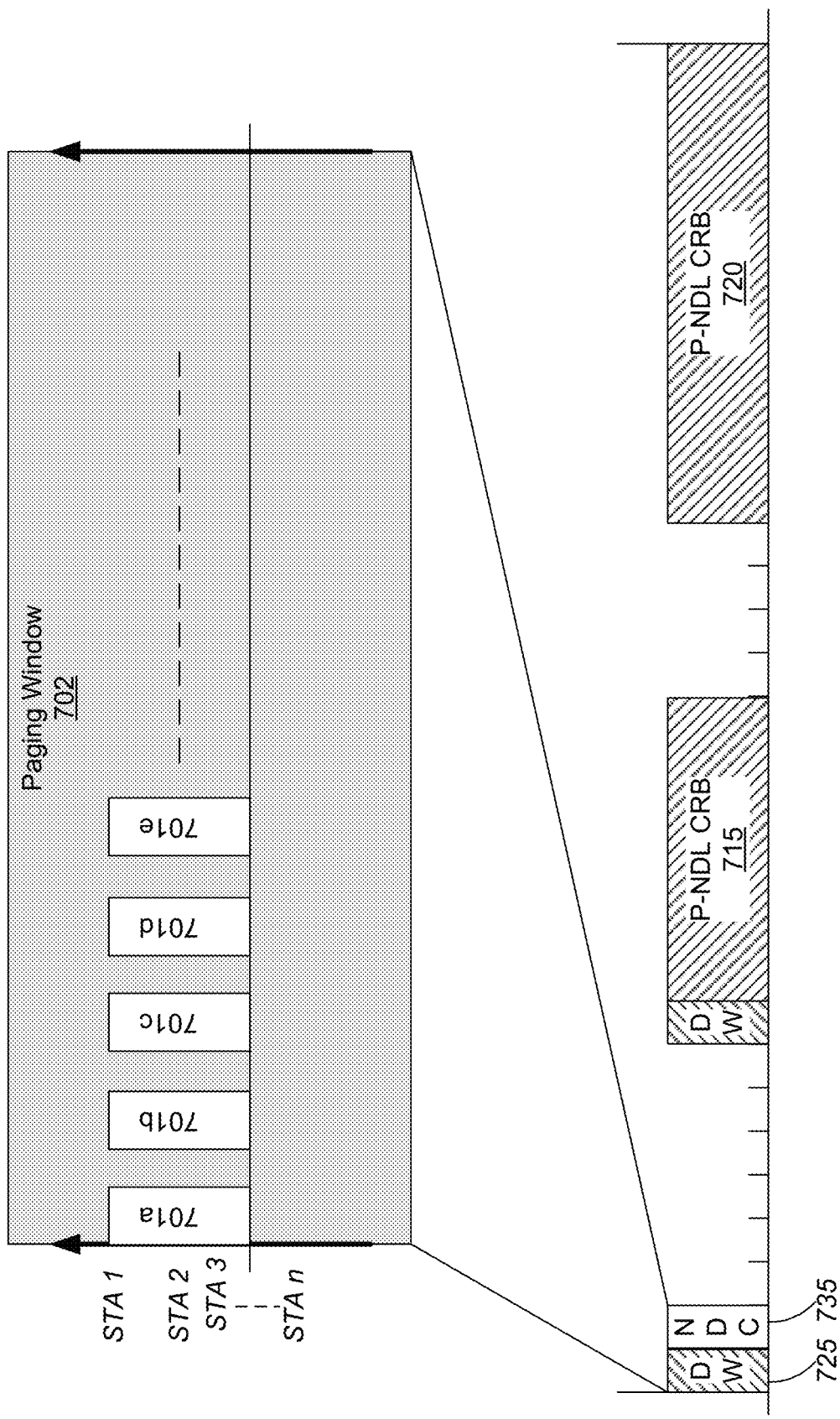
FIG. 7B illustrates an example of a device continuing transmission of data across multiple paged data link CRBs, according to some embodiments.

In some embodiments, as illustrated by FIG. 7B, after a device (e.g., such as client station 106) indicates it has pending (buffered) data transmissions for a paged data link peer and the device does not complete the buffered transmissions by the end of an NDC CRB 735 or a paged data link CRB (e.g., P-NDL CRB 715), the device may set a more data (MD) subfield (or attribute) in a medium access control (MAC) header of one or more transmitted data frames (e.g., transmitted within P-NDL CRB 715) to indicate that the device has addition data to transmit to a peer device. In such instances, the device may be present at the beginning of the next paged data link CRB (e.g., P-NDL CRB 720) and may wait for a trigger frame from the peer device. In some embodiments, the device may transmit a paging message at the beginning of the next paged data link CRB and/or the device may wait for a short period (e.g., one or more TUs) for the trigger frame from the peer device. In some embodiments, the device may transmit the paging message if the device does not receive the trigger frame from the peer device by the end of the short period. In some embodiments, when a peer device receives an indication that the device has more data to transmit at the end of an NDC CRB and/or a paged data link CRB, the peer device may skip a PW of the next paged data link CRB (excluding the NDC CRB) and may transmit a trigger frame to the device at the start of the paged data link CRB.

Figure 8:
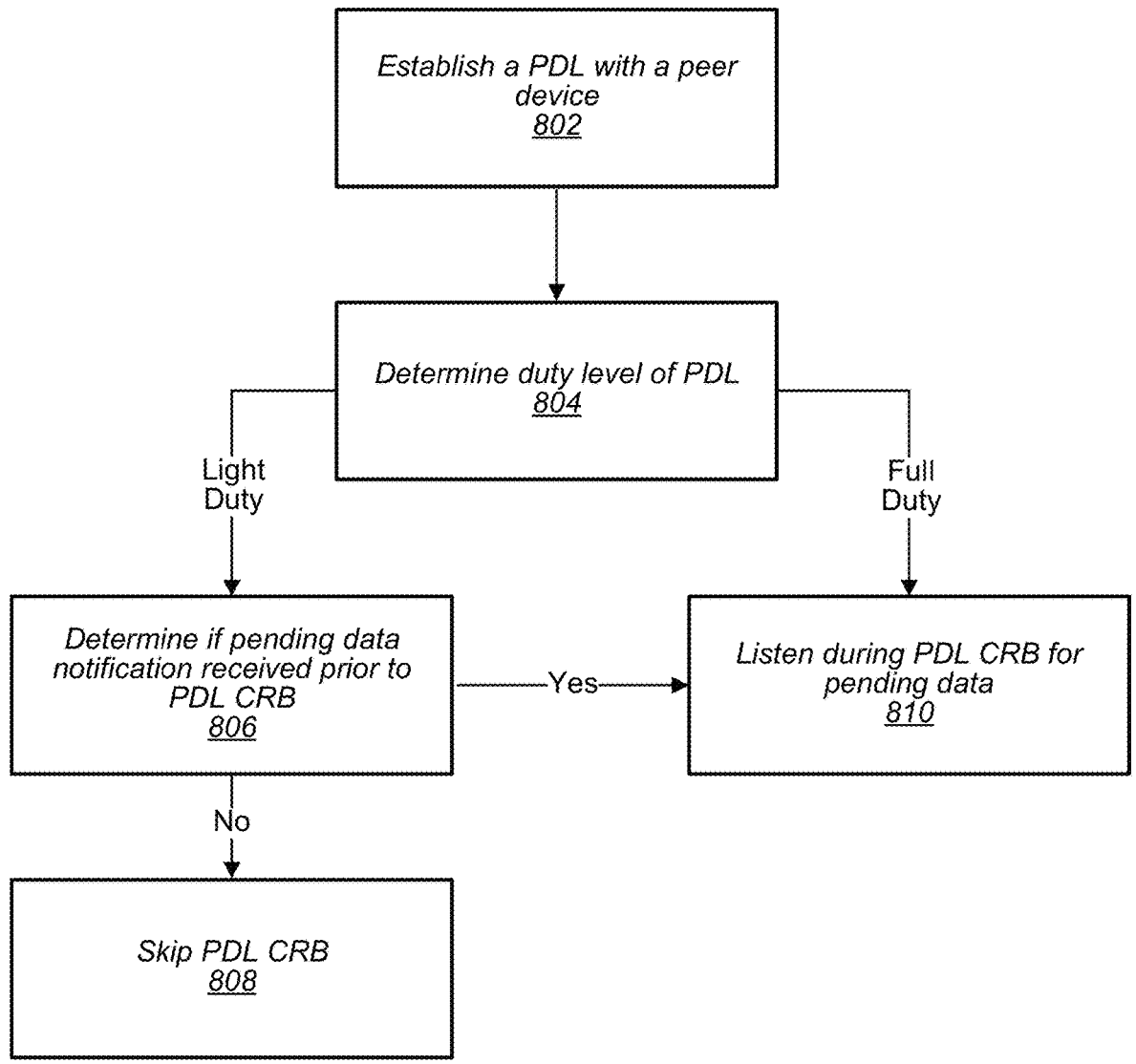
FIG. 8 illustrates a block diagram of an example of a method for determining a duty level of a device during a paged data link, according to some embodiments.

FIG. 8 illustrates a block diagram of an example of a method for determining a duty level of a device during a paged data link, according to some embodiments. The method shown in FIG. 8 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 802, a device (e.g., such as client station 106) may establish a paged data link (PDL) with a (neighboring) peer device. At 804, when the device establishes the PDL with the peer device, the device may choose (or determine) whether the device will serve as a "full duty" device or a "light duty" device. In some embodiments, the choice (or determination) may be based, at least in part, on one or more power requirement factors associated with the device. In some embodiments, a "full duty" device may be present at the beginning of all paged data link CRBs. In some embodiments, a "light duty" device may skip one or more paged data link CRBs, e.g., dependent upon data exchange conditions. Note that a "light duty" device may be present during NDC CRBs. At 806, if the device determines to operate as a "light duty" device, the device may determine whether a pending data indication has been received from the peer device prior to a next paged data link CRB. At 808, if an indication has not been received, the device may skip the next paged data link CRB. Alternatively, at 810, if an indication has been received, the device may listen during the next paged data link CRB, e.g., to receive the pending data. In other words, a "light duty" device may not skip a paged data link CRB if a peer device indicates it has pending data during an immediately preceding NDC CRB (e.g., the most recent NDC CRB) and/or paged data link CRB. Similarly, if at 804 the device determined to operate as a "full duty" device, then, at 810, the device may listen during the next paged data link CRB.

In some embodiments, if both devices of a paged data link pair determine to serve as "full duty" devices, both devices may need to be present at the beginning of every paged data link CRB. In some embodiments, if one device of the device pair determines to serve as a "full duty" device, while the other device determines to serve as a "light duty" device, the "full duty" device may be present at the beginning of all paged data link CRBs while the "light duty" device may skip one or more paged data link CRBs, dependent upon data exchange conditions. However, as noted above, the "light duty" device may not skip a paged data link CRB if the "full duty" device has indicated it has pending data during an immediately preceding NDC CRB and/or paged data link CRB (e.g., via the more data field described above). In addition, in some embodiments, if both devices of the paged data link pair determine to serve as "light duty" devices, the devices may both skip one or more paged data link CRBs but may be present during the NDC CRBs. Note that the devices may not skip a paged data link CRB if one of the devices has indicated (e.g., via the more data field described above) it has (or still has more) pending data during the immediately preceding NDC CRB or paged data link CRB.

Figure 9A:
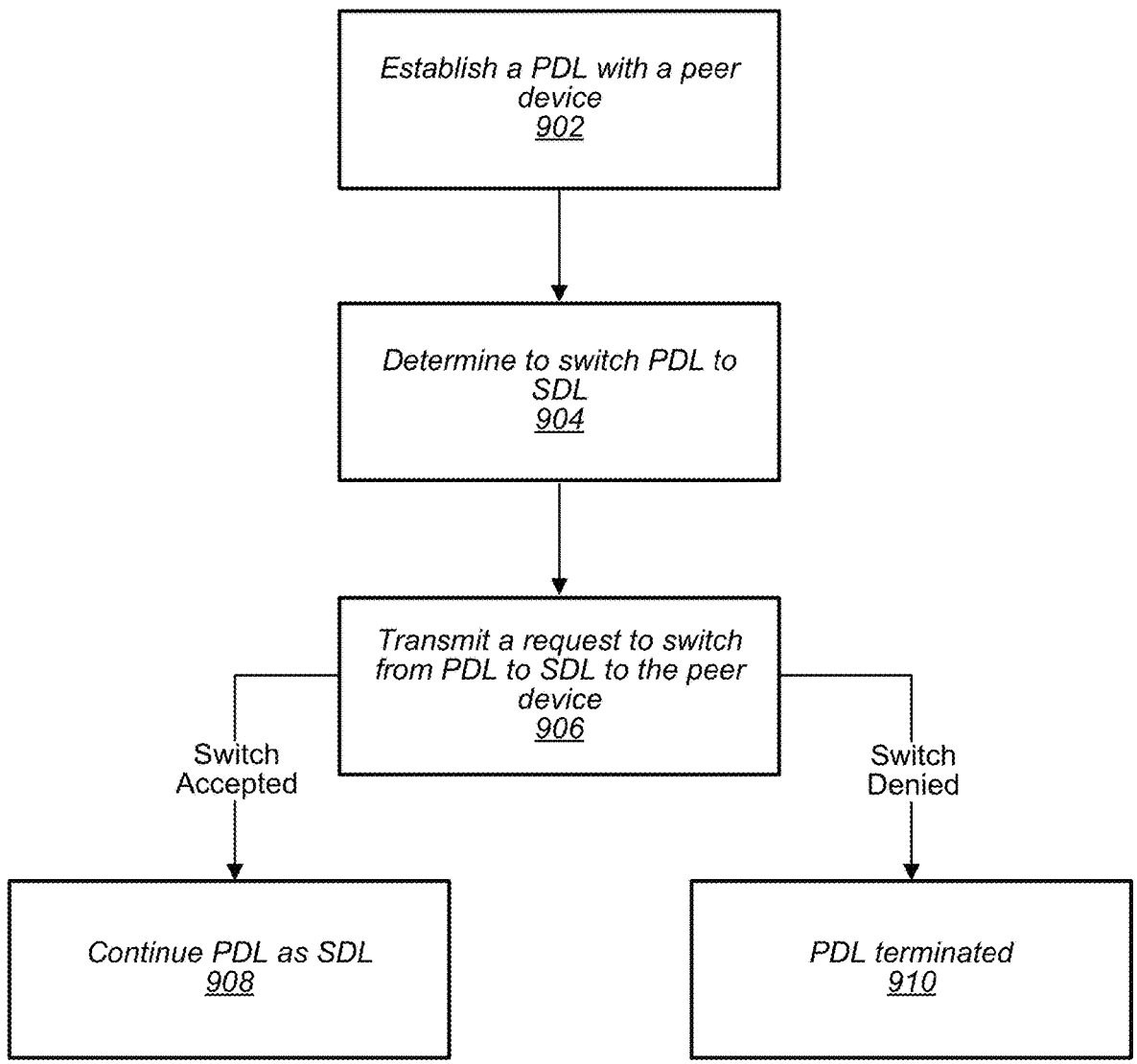
FIG. 9A illustrates a block diagram of an example of a method for switching from a paged data link to a synchronized data link, according to some embodiments.
Figure 9B:
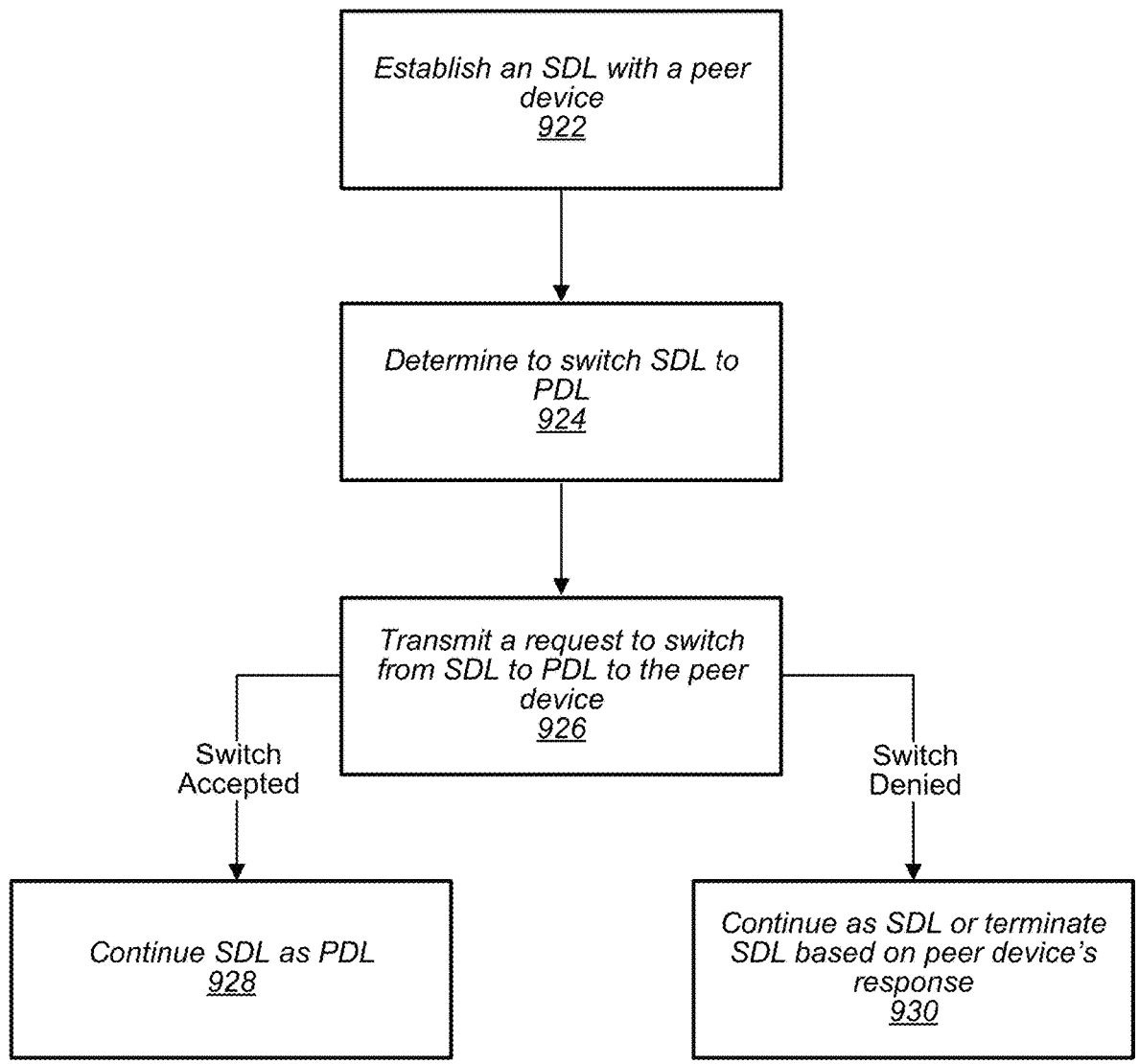
FIG. 9B illustrates a block diagram of an example of a method for switching from a synchronized data link to a paged data link, according to some embodiments.

In some embodiments, once a device pair establishes a page data link (or a synchronized data link), either device may initiate a data link schedule update handshake to switch the data link to a synchronized data link (or a paged data link). For example, FIG. 9A illustrates a block diagram of an example of a method for switching from a paged data link to a synchronized data link, according to some embodiments, and FIG. 9B illustrates a block diagram of an example of a method for switching from a synchronized data link to a paged data link, according to some embodiments. The methods shown in FIGS. 9A and 9B may be used in conjunction with any of the systems or devices shown in the above Figures, among other devices. In various embodiments, some of the method elements shown may be performed concurrently, in a different order than shown, or may be omitted. Additional method elements may also be performed as desired. As shown, these methods may operate as follows.

Turning to FIG. 9A, at 902, a peer device may establish a paged data link with a peer device and, at 904, the device may determine to switch the paged data link to a synchronized data link. The switch, in some embodiments, may be based (at least in part) on application traffic conditions. For example, a device pair may switch to a synchronized data link when the device pair has a constant (or consistent or frequent) traffic flow (e.g., such as video streaming) and wants to avoid paging and triggering at every CRB. At 906, the device may transmit a request to switch from the paged data link to the synchronized data to the peer device. In some embodiments, the peer device may either accept the switch or reject the switch and terminate the data link. Thus, if the peer device accepts the switch, the method may continue at 908 and the paged data link may become a synchronized data link once the update handshake is successfully concluded. Conversely, if the peer device denies the switch, the method may continue at 910 and the paged data link may be terminated.

Turning to FIG. 9B, at 922, a peer device may establish a synchronized data link with a peer device and, at 924, the device may determine to switch the synchronized data link to a paged data link. The switch, in some embodiments, may be based (at least in part) on application traffic conditions. For example, a device pair may switch to a paged data link when the device pair has bursty (e.g., intermittent, infrequent, or low levels) and/or unpredictable traffic flow and thus wants to enable paging and triggering for more power efficient operation. At 926, the device may transmit a request to switch from the synchronized data link to the paged data to the peer device. In some embodiments, when the device requests, to the peer device, a switch from a synchronized data link to a paged data link, the peer device may accept the switch, reject the switch, or reject the switch and terminate the data link. Note that if the peer device accepts the switch, the data link may become a paged data link from a next CRB. Note further that if the peer device rejects (without terminating) the switch, the data link may continue as a synchronized data link for subsequent CRBs. Thus, if the peer device accepts the switch, the method may continue at 928 and the synchronized data link may become a paged data link once the update handshake is successfully concluded. Conversely, if the peer device denies the switch, the method may continue at 930 and the synchronized data link may continue as a synchronized data link or may be terminated based on the peer device's response.

Figure 10:
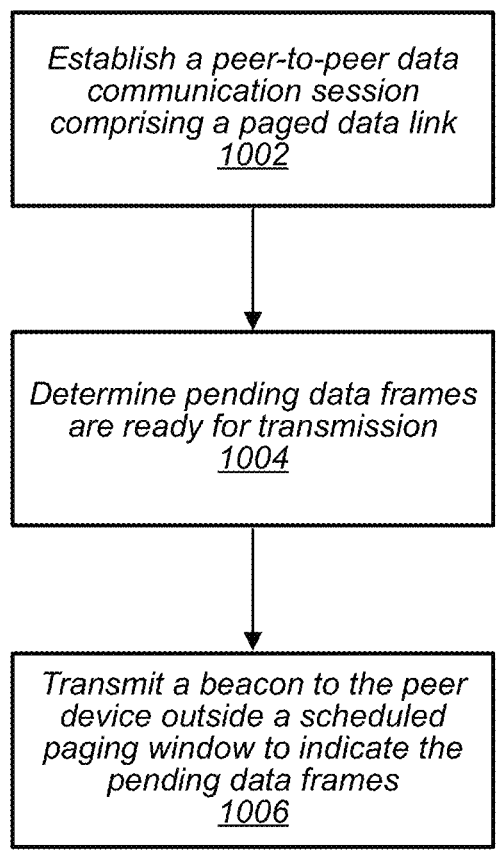
FIG. 10 illustrates a block diagram of an example of a method for indicating pending data frames outside of a paging window, according to some embodiments.

FIG. 10 illustrates a block diagram of an example of a method for indicating pending data frames outside of a paging window, according to some embodiments. The method shown in FIG. 10 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1002, a wireless station (e.g., such as client station 106) may establish a peer-to-peer data communication session with a peer (neighboring) wireless station. The peer-to-peer data communication may include a paged data link (PDL). The wireless station and the peer wireless station may be associated with a data cluster. In some embodiments, to establish the peer-to-peer data communication session, the wireless station may determine a service mode of the wireless station. In some embodiments, in a first service mode, the wireless station may be available for communications at a start of all paged data link common resource blocks (CRBs). In other words, the wireless station may operate as a "full duty" device. In some embodiments, in a second service mode, the wireless station may be unavailable in one or more paged data link CRBs, based, at least in part, on data exchange conditions. In other words, the wireless station may operate as a "light duty" device. In some embodiments, when the wireless station is in the second service mode, the wireless station may be available in a paged data link CRB based, at least in part, on the peer wireless station indicating that the peer wireless station has pending data. In some embodiments, the indication may be received in an immediately previous CRB. In some embodiments, the immediately previous CRB may be an NDC CRB and/or a paged data link CRB. In other words, the immediately previous CRB may be an NDC CRB, a paged data link CRB, or an NDC CRB and a paged data link CRB. Said another way, the immediately previous CRB may be at least one of an NDC CRB and a paged data link CRB.

At 1004, the wireless station may determine that there are pending data frames to transmit for the paged data link. In other words, the wireless station may determine that there is pending data for the peer wireless station.

At 1006, the wireless station may transmit, outside of a scheduled paging window associated with the paged data link, a beacon to the peer wireless station. The beacon may include a paging attribute indicating the pending data frames. In some embodiments, the paging attribute may include a peer data link identifier bitmap. The peer data link identifier bitmap may indicate pending data for neighboring peer stations. For example, if the wireless station establishes (or has established) PDLs with multiple neighboring peer stations, the peer data link identifier bitmap may indicate which neighboring peer stations the wireless station has pending data ready for transmission. In some embodiments, stations within the data cluster may have scheduled periodic common resource blocks (CRBs) and the beacon may be transmitted in the scheduled periodic CRBs. In some embodiments, the beacon may be transmitted with a higher medium access priority than other frames transmitting during the scheduled periodic CRBs. In some embodiments, the beacon may be transmitted in a discovery window. In some embodiments, the beacon may be a discovery beacon and/or a synchronization beacon.

In some embodiments, in response to receiving a first trigger message from the peer wireless station at a start of a first CRB, the wireless station may transmit a first portion of the pending data in the first CRB via one or more data frames. In some embodiments, at least one of the one or more data frames may include a header that may include a more data attribute. In some embodiments, the more data attribute may include an indication that the wireless station has a second portion pending data not transmitted in the first CRB. In some embodiments, in response to receiving a second trigger message from the peer wireless station at a start of a second (subsequent) CRB, the wireless station may transmit the second portion of the pending data in the second CRB.

In some embodiments, the wireless station may initiate a data link schedule update handshake to switch the paged data link to a synchronized data link, based, at least in part, on application traffic conditions. In some embodiments, in response to the peer wireless station accepting the switch, the wireless station may switch the paged data link to the synchronized data link upon completion of the data link schedule update handshake. In some embodiments, in response to the peer wireless station declining the switch, the wireless station may terminate the paged data link.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
    at least one antenna;
    at least one radio in communication with the at least one antenna and configured to perform communications via a Wi-Fi interface; and
    at least one processor in communication with the at least one radio;
    wherein the at least one processor is configured to cause the wireless station to:
        establish, with a peer wireless station, a peer-to-peer data communication session comprising a paged data link, wherein the wireless station and the peer wireless station are associated with a data cluster, wherein the wireless station operates in at least one of a first mode of operation or a second mode of operation, wherein in the first mode of operation the wireless station is configured to be available for communications at a start of all paged data link common resource blocks (CRBs);
        determine that the wireless station has one or more pending data frames to transmit using the paged data link; and
        transmit, outside of a scheduled paging window associated with the paged data link, a beacon to the peer wireless station, wherein the beacon comprises a paging attribute indicating the one or more pending data frames.

2. The wireless station of claim 1,
    wherein stations associated with the data cluster have scheduled periodic CRBs, wherein, to transmit the beacon, the at least one processor is further configured to cause the wireless station to transmit the beacon in a next scheduled periodic CRB.

3. The wireless station of claim 2,
    wherein, to transmit the beacon in the next scheduled periodic CRB, the at least one processor is further configured to cause the wireless station to transmit the beacon with a higher medium access priority than one or more other frames transmitted during the next scheduled periodic CRBs.

4. The wireless station of claim 1,
    wherein the beacon is at least one of a discovery beacon or a synchronization beacon.

5. The wireless station of claim 1,
    wherein the paging attribute comprises a peer data link identifier bitmap.

6. The wireless station of claim 1,
    wherein the at least one processor is further configured to cause the wireless station to:
        transmit, in response to receiving a first trigger message from the peer wireless station at a start of a first paged data link CRB, a first portion of the one or more pending data frames in the first paged data link CRB via one or more transmitted data frames, wherein at least one of the one or more transmitted data frames includes a header comprising a more data attribute that includes an indication that the wireless station has a second portion comprising at least one pending data frame not transmitted in the first paged data link CRB.

7. The wireless station of claim 6,
    wherein the at least one processor is further configured to cause the wireless station to:
        transmit, in response to receiving a second trigger message from the peer wireless station at a start of a second paged data link CRB, the second portion in the second paged data link CRB.

8. The wireless station of claim 1,
    wherein in the second mode of operation, the wireless station is available in a paged data link CRB based, at least in part, on the peer wireless station indicating that the peer wireless station has pending data, wherein the indication is received prior to the paged data link CRB.

9. An apparatus, comprising:
    a memory; and
    at least one processor in communication with the memory, wherein the at least one processor is configured to:
        establish, with a peer wireless station, a peer-to-peer data communication session comprising a paged data link, wherein the apparatus and the peer wireless station are associated with a data cluster;
        determine that there are pending data frames to transmit using the paged data link; and
        generate instructions to transmit, outside of a scheduled paging window associated with the paged data link, a beacon to the peer wireless station, wherein the beacon is at least one of a discovery beacon or a synchronization beacon, and wherein the beacon comprises a paging attribute indicating the pending data frames.

10. The apparatus of claim 9,
    wherein the paging attribute comprises a peer data link identifier bitmap.

11. The apparatus of claim 9,
    wherein stations within the data cluster have scheduled periodic CRBs, wherein, to transmit the beacon, the at least one processor is further configured to generate instructions to transmit the beacon in a next scheduled periodic CRB.

12. The apparatus of claim 11,
    wherein, to generate instructions to transmit the beacon in the next scheduled periodic CRB, the at least one processor is further configured to generate instructions to transmit the beacon with a higher medium access priority than one or more other frames transmitted during the next scheduled periodic CRBs.

13. The apparatus of claim 9,
    wherein the at least one processor is further configured to:
        generate instructions to transmit, in response to receiving a first trigger message from the peer wireless station at a start of a first paged data link CRB, a first portion of the pending data frames in the first paged data link CRB via one or more outgoing data frames, wherein at least one of the one or more outgoing data frames includes a header comprising a more data attribute that includes an indication of a second portion of one or more pending data frames not transmitted in the first paged data link CRB.

14. The apparatus of claim 13,
wherein the at least one processor is further configured to:
generate instructions to transmit, in response to receiving a second trigger message from the peer wireless station at a start of a second paged data link CRB, the second portion in the second paged data link CRB.

15. The apparatus of claim 9,
wherein, to establish the peer-to-peer data communication session, the at least one processor is further configured to:
determine a service mode for the paged data link, wherein in a first mode, the apparatus is available for communications at a start of all paged data link common resource blocks (CRBs) associated with the paged data link, wherein in a second mode, the apparatus is available in a paged data link CRB based, at least in part, on the peer wireless station indicating that the peer wireless station has pending data, wherein the indication is received prior to the paged data link CRB.

16. A non-transitory computer readable memory medium storing program instructions executable by processing circuitry to cause a wireless station to:
establish, with a peer wireless station, a peer-to-peer data communication session comprising a paged data link, wherein the wireless station and the peer wireless station are associated with a data cluster;
determine that the wireless station has one or more pending data frames to transmit using the paged data link; and
generate instructions to transmit, outside of a scheduled paging window associated with the paged data link, a beacon to the peer wireless station, wherein the beacon comprises a paging attribute indicating the pending data frames.

17. The non-transitory computer readable memory medium of claim 16,
wherein the beacon is at least one of a discovery beacon or a synchronization beacon.

18. The non-transitory computer readable memory medium of claim 16,
wherein the paging attribute comprises a peer data link identifier bitmap.

19. The non-transitory computer readable memory medium of claim 16,
wherein stations associated with the data cluster have scheduled periodic common resource blocks (CRBs), wherein the beacon is transmitted in the scheduled periodic CRBs, and wherein the program instructions are further executable to generate instructions to transmit the beacon with a higher medium access priority than one or more other frames transmitted during the scheduled periodic CRBs.

20. The non-transitory computer readable memory medium of claim 16,
wherein, to establish the peer-to-peer data communication session comprising the paged data link, the program instructions are further executable to:
determine a service mode of the wireless station, wherein in a first mode, the wireless station is available for communications at a start of all paged data link common resource blocks (CRBs) associated with the paged data link, wherein in a second mode, the wireless station is available in a paged data link CRB based, at least in part, on the peer wireless station indicating that the peer wireless station has pending data, wherein the indication is received prior to the paged data link CRB.

* * * * *